US012609401B2

(12) United States Patent
Deng et al.

(10) Patent No.: US 12,609,401 B2
(45) Date of Patent: Apr. 21, 2026

(54) BATTERY PACK

(71) Applicant: CALB Co., Ltd., Jiangsu (CN)

(72) Inventors: Feng Deng, Changzhou (CN); Xinwei Jiang, Changzhou (CN); Zhaoyang Jin, Changzhou (CN)

(73) Assignee: CALB Co., Ltd., Jiangsu (CN)

( * ) Notice: Subject to any disclaimer, the term of this patent is extended or adjusted under 35 U.S.C. 154(b) by 612 days.

(21) Appl. No.: 18/081,650

(22) Filed: Dec. 14, 2022

(65) Prior Publication Data

US 2023/0420786 A1     Dec. 28, 2023

(30) Foreign Application Priority Data

Jun. 24, 2022   (CN) .......................... 202210731407.6

(51) Int. Cl.
H01M 50/271     (2021.01)
H01M 50/262     (2021.01)

(52) U.S. Cl.
CPC ....... H01M 50/271 (2021.01); H01M 50/262 (2021.01)

(58) Field of Classification Search
CPC .............................................. B60K 2001/0438
See application file for complete search history.

(56) References Cited

U.S. PATENT DOCUMENTS

| | | | | |
|---|---|---|---|---|
| 9,227,582 | B2 * | 1/2016 | Katayama | ............. H01M 50/24 |
| 2015/0135939 | A1 * | 5/2015 | Rawlinson | ................ F41H 5/04 |
| | | | | 89/36.08 |
| 2020/0070671 | A1 | 3/2020 | Ohkuma | |
| 2022/0063389 | A1 * | 3/2022 | Suewaka | ............. H01M 50/204 |
| 2023/0047239 | A1 * | 2/2023 | Lenz | ................... H01M 50/262 |

FOREIGN PATENT DOCUMENTS

| | | |
|---|---|---|
| CN | 206564277 | 10/2017 |
| CN | 214647604 | 11/2021 |
| CN | 114103615 | 3/2022 |

OTHER PUBLICATIONS

"Search Report of Europe Counterpart Application", issued on Sep. 12, 2023, p. 1-p. 6.
"Office Action of China Counterpart Application", issued on Oct. 1, 2025, p. 1-p. 6.

* cited by examiner

*Primary Examiner* — Maria Laios
(74) *Attorney, Agent, or Firm* — JCIP GLOBAL INC.

(57) ABSTRACT

A battery pack includes a bottom plate, a bottom shield plate and a beam. The bottom shield plate is disposed below the beam, the bottom plate is disposed between the bottom shield plate and the beam, a positioning hole is disposed on the bottom shield plate. The battery pack further includes a protective cover, a portion of the protective cover is disposed in the positioning hole and connected to the bottom shield plate, a top portion of the protective cover abuts against the beam, and the beam, the bottom shield plate, and the protective cover are connected by a fastener penetrating the protective cover.

11 Claims, 3 Drawing Sheets

BATTERY PACK

CROSS-REFERENCE TO RELATED APPLICATION

This application claims the priority benefits of China application serial no. 202210731407.6, filed on Jun. 24, 2022. The entirety of the above-mentioned patent application is hereby incorporated by reference herein and made a part of this specification.

BACKGROUND

Technology Field

The disclosure relates to the technical field of batteries, and particularly, to a battery pack.

Description of Related Art

A bottom plate is still sandwiched between the bottom shield plate and the beam of a conventional battery pack, so there is a gap between the bottom shield plate and the beam. However, when the bottom shield plate and the beam are connected together by a fastener, the bottom shield plate is pulled toward the beam direction, which easily subjects the bottom shield plate to damage.

SUMMARY

The disclosure provides a battery pack.

According to an aspect of the disclosure, a battery pack is provided. The battery pack includes a bottom plate, a bottom shield plate, and a beam. The bottom shield plate is disposed below the beam, the bottom plate is disposed between the bottom shield plate and the beam, and a positioning hole is disposed on the bottom shield plate. The battery pack further includes a protective cover, a portion of the protective cover is disposed in the positioning hole and connected to the bottom shield, a top portion of the protective cover abuts against the beam, and the beam, the bottom shield plate, and the protective cover are connected by a fastener penetrating the protective cover.

BRIEF DESCRIPTION OF THE DRAWING

For a better understanding of the disclosure, reference may be made to exemplary embodiments shown in the following drawings. The components in the drawings are not necessarily to scale and related elements may be omitted, or in some instances proportions may have been exaggerated, so as to emphasize and clearly illustrate the features described herein. In addition, related elements or components can be variously arranged, as known in the art. Further, in the drawings, like reference numerals designate same or like parts throughout the several views.

DESCRIPTION OF THE EMBODIMENTS

The technical solutions in the exemplary embodiments of the disclosure will be described clearly and explicitly in conjunction with the drawings in the exemplary embodiments of the disclosure. The description proposed herein is just the exemplary embodiments for the purpose of illustrations only, not intended to limit the scope of the disclosure, so it should be understood that and various modifications and variations could be made thereto without departing from the scope of the disclosure.

In the description of the present disclosure, unless otherwise specifically defined and limited, the terms "first", "second" and the like are only used for illustrative purposes and are not to be construed as expressing or implying a relative importance. The term "plurality" is two or more. The term "and/or" includes any and all combinations of one or more of the associated listed items.

In particular, a reference to "the" object or "a" and "an" object is intended to denote also one of a possible plurality of such objects. Unless otherwise defined or described, the terms "connect", "fix" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

Further, in the description of the present disclosure, it should be understood that spatially relative terms, such as "above", "below" "inside", "outside" and the like, are described based on orientations illustrated in the figures, but are not intended to limit the exemplary embodiments of the present disclosure.

In the context, it should also be understood that when an element or features is provided "outside" or "inside" of another element(s), it can be directly provided "outside" or "inside" of the other element, or be indirectly provided "outside" or "inside" of the another element(s) by an intermediate element.

Figure 1:
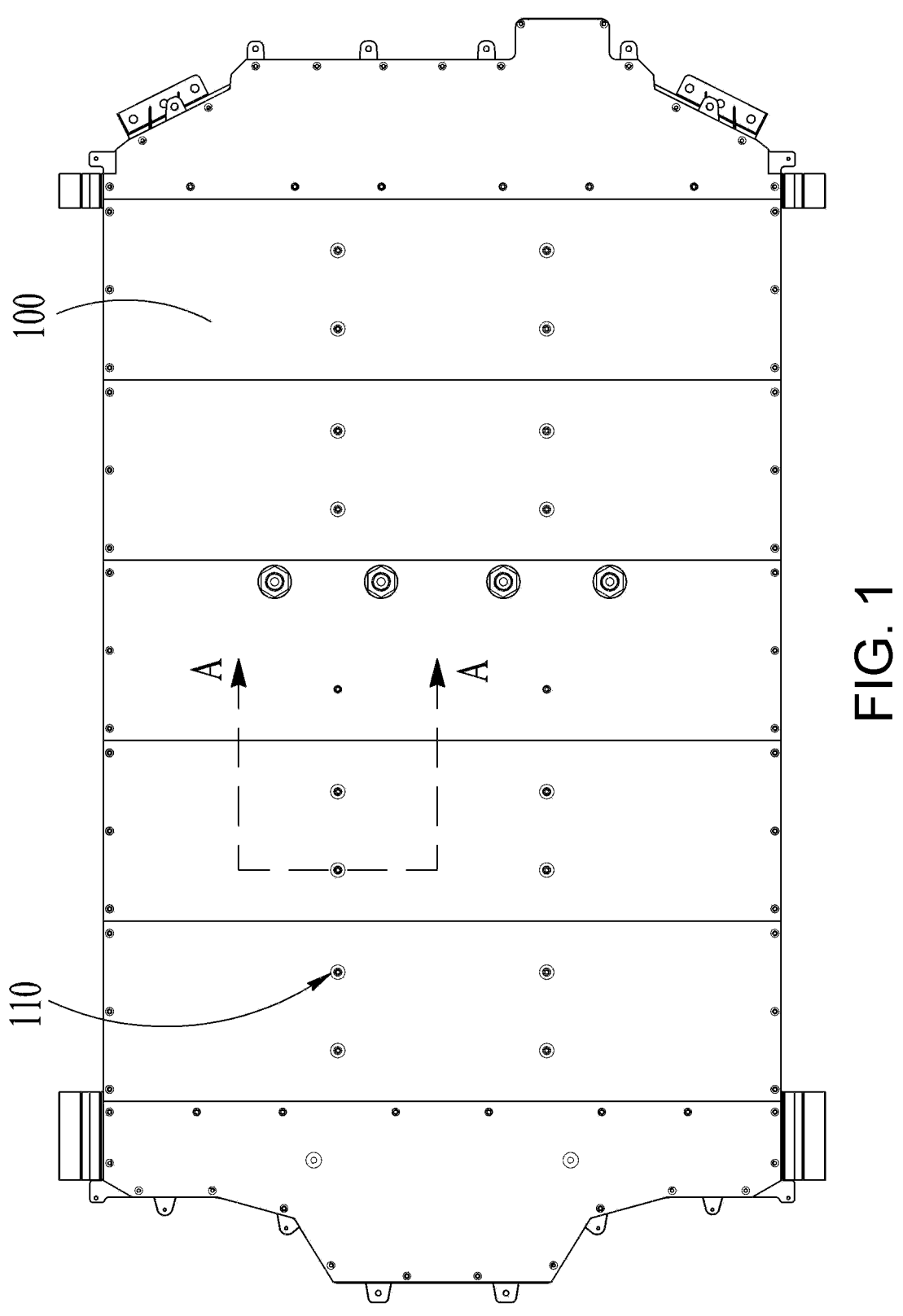
FIG. 1 is a bottom view of a battery pack according to an exemplary embodiment.

Referring to FIG. 1, FIG. 1 is a bottom view representatively illustrating a battery pack proposed by the disclosure. In the exemplary embodiment, the battery pack proposed by the disclosure is illustrated by taking a vehicle-mounted battery as an example. For those skilled in the art, it is easy to understand that to apply the related design of the disclosure to other types of battery packs, various modifications, additions, substitutions, deletions or other changes may be made to the following specific embodiments, and the changes are still within the scope of the principles of the battery pack proposed by the disclosure.

Figure 2:
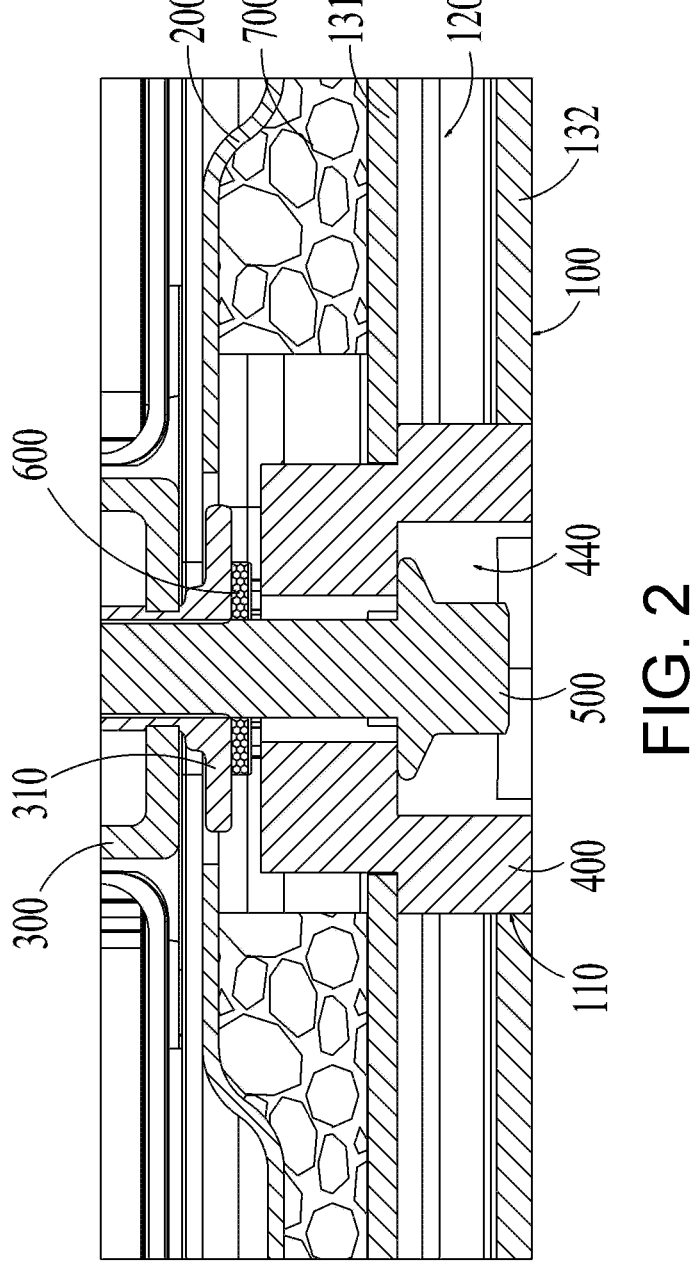
FIG. 2 is a sectional view taken along line A-A in FIG. 1.
Figure 3:
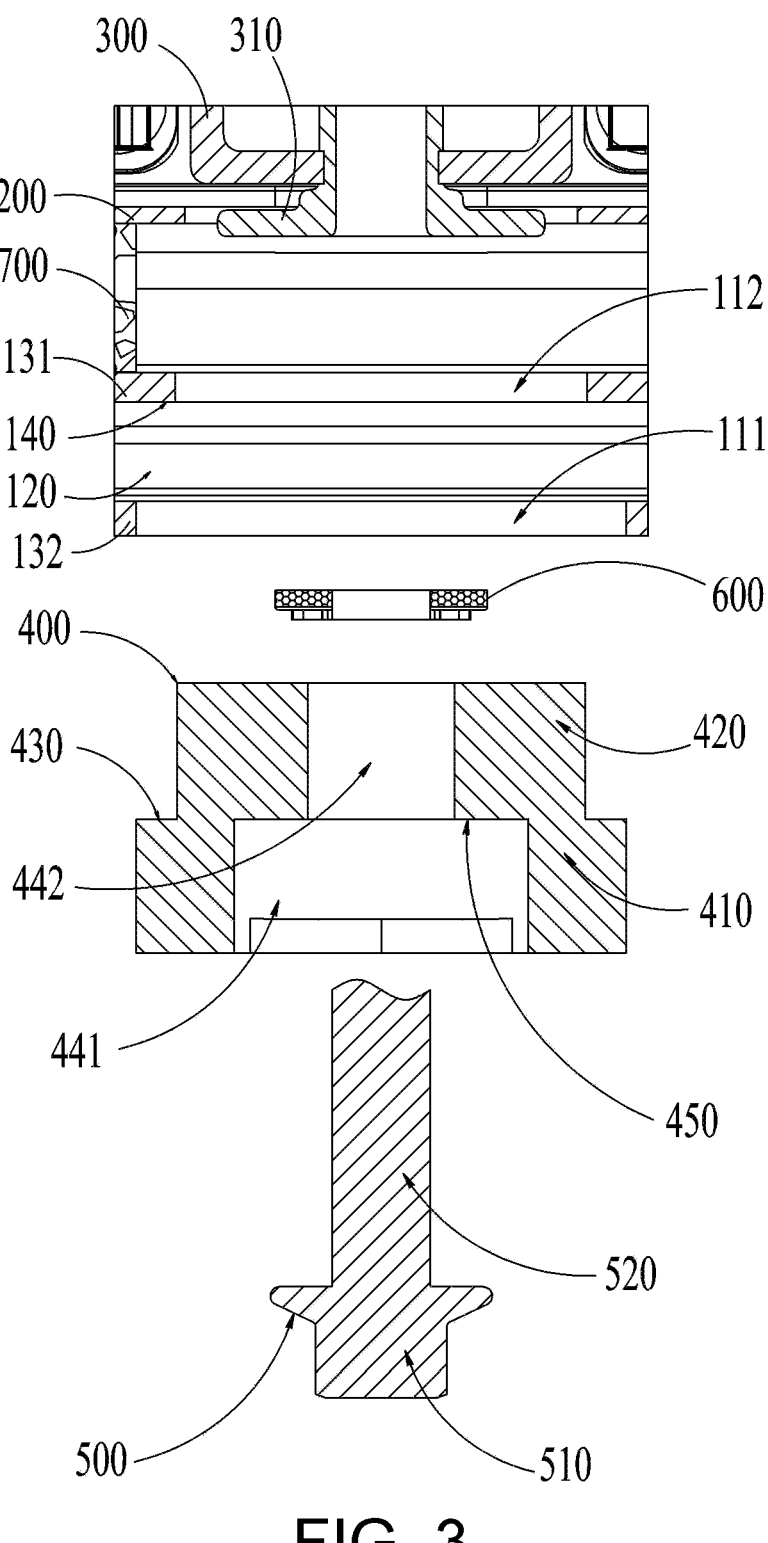
FIG. 3 is an exploded schematic view of FIG. 2.

As shown in FIG. 1, in an embodiment of the disclosure, the disclosure provides a battery pack including a bottom plate, a bottom shield plate 100, and a beam. Referring to FIG. 2 and FIG. 3 together, FIG. 2 is representatively a sectional view taken along line A-A in FIG. 1, and FIG. 3 is representatively an exploded schematic view of FIG. 2. The structure, connection mode and functional relationship of each main component of the battery pack proposed by the disclosure are to be described in detail below with reference to the drawings.

As shown in FIG. 2 and FIG. 3, in an embodiment of the disclosure, the bottom shield plate 100 is disposed below a beam 300, and a bottom plate 200 is disposed between the bottom shield plate 100 and the beam 300. A positioning hole 110 is disposed on the bottom shield plate 100, and the battery pack proposed by the disclosure further includes a protective cover 400. A portion of the protective cover 400 is disposed in the positioning hole 110 and connected to the bottom shield plate 100, a top portion of the protective cover 400 abuts against the beam 300, and the beam 300, the bottom shield plate 100, and the protective cover 400 are connected together by a fastener penetrating the protective cover 400. With the abovementioned design, the disclosure can utilize the abutment design between the protective cover 400 and the beam 300, and on the basis of ensuring the reliability of the connection between the bottom shield plate 100 and the beam 300, the disclosure can further optimize the connection effect of the two, and improve the connection between the bottom shield plate 100 and the beam 300, the problem of structural damage to the bottom shield plate 100 caused by pulling the bottom shield plate 100 in the direction of the beam 300 when being fixed by the fastener is prevented.

As shown in FIG. 2 and FIG. 3, in one embodiment of the disclosure, the bottom shield plate 100 may be an extruded profile plate. On this basis, the bottom shield plate 100 has a cavity thereinside. With the structural design, the disclosure can reduce the weight of the bottom shield plate 100, which is beneficial to the lightweight design of the battery pack and can also improve the structural strength of the bottom shield plate 100, so that the problem of damage to the flow passage resulting from squeezing the inside, e.g., the heat exchange plate, of the battery box due to the impact of the bottom, is prevented, and this improves the overall reliability of the battery pack. Meanwhile, the configuration of the cavity can reduce the heat dissipation of the battery pack through the bottom shield plate 100 and further improve the temperature consistency of the battery pack.

As shown in FIG. 2 and FIG. 3, with the design in which the bottom shield plate 100 is an extruded profile plate with a cavity 120, in an embodiment of the disclosure, the positioning hole 110 can penetrate the cavity 120, and the protective cover 400 can block the cavity 120. With the design, the disclosure can use the protective cover 400 to block the cavity 120 exposed by the positioning hole 110, so as to prevent foreign matters from entering the cavity 120 of the bottom shield plate 100 and further optimize the sealing performance. In some embodiments, the positioning hole 110 may also not penetrate the cavity, that is, the channel of the positioning hole 110 and the cavity of the bottom shield plate 100 may not communicate with each other. For example, an annular wall surrounding the channel of the positioning hole 110 can be disposed in the cavity, accordingly, the positioning hole 110 is defined, and the channel of the positioning hole 110 is separated from the cavity.

As shown in FIG. 2 and FIG. 3, with the design in which the bottom shield plate 100 is an extruded profile plate with a cavity 120, in an embodiment of the disclosure, the bottom shield plate 100 has an upper wall 131 and a lower wall 132 apart from each other. Specifically, the upper wall 131 is closer to the bottom plate 200 than the lower wall 132, and the cavity 120 is located between the upper wall 131 and the lower wall 132. On this basis, the positioning hole 110 penetrates through the upper wall 131 and the lower wall 132.

With the design in which the bottom shield plate 100 has the upper wall 131 and the lower wall 132, in an embodiment of the disclosure, a rib plate may be disposed in the cavity 120, and the rib plate is supported between the upper surface of the lower wall 132 and the lower surface of the upper wall 131.

As shown in FIG. 2 and FIG. 3, with the design in which the bottom shield plate 100 has the upper wall 131 and the lower wall 132, in an embodiment of the disclosure, the positioning hole 110 may have a first hole 111 and a second hole 112 that communicate with each other. Specifically, the first hole 111 penetrates the lower wall 132, and the second hole 112 penetrates the upper wall 131. On this basis, the diameter of the first hole 111 may be greater than the diameter of the second hole 112, such that the lower surface of the upper wall 131 forms a first step 140 on the periphery of the second hole 112. With the design, the disclosure can implement the configuration of the positioning hole 110 on the bottom shield plate 100 having the upper wall 131 and the lower wall 132. Meanwhile, the disclosure can utilize the first step 140 to implement structural limit. Preferably, the first hole 111 and the second hole 112 can be coaxially disposed to facilitate the formation.

As shown in FIGS. 2 and 3, with the design in which the positioning hole 110 has the first hole 111 and the second hole 112, in an embodiment of the disclosure, the protective cover 400 may have a first portion 410 and a second portion 420 connected to each other. Specifically, the second portion 420 is closer to the beam 300 than the first portion 410. The first portion 410 is partially disposed in the first hole 111 (from the above, the first portion 410 can block the cavity of the bottom shield plate 100), a portion of the second portion 420 is disposed in the second hole 112, and another portion of the second portion 420 protrudes out of the second hole 112 and abuts against the beam 300. Since the first portion 410 and the second portion 420 are respectively disposed in the first hole 111 and the second hole 112, that is, the outer diameter of the first portion 410 is greater than the outer diameter of the second portion 420. On this basis, a second step 430 may be formed at the connection between the first portion 410 and the second portion 420, and the second step 430 is limited and fitted with the first step 140. With the design, in the disclosure, the relative position limit of the protective cover 400 in the positioning hole 110 is implemented with the design in which the first step 140 is fitted with the second step 430.

As shown in FIG. 2 and FIG. 3, with the design in which the protective cover 400 has the first portion 410 and the second portion 420, in an embodiment of the disclosure, a through hole 440 may be disposed on the protective cover 400, and the through hole 440 penetrates the protective cover 400. The through hole 440 is used to accommodate the fastener. Specifically, the through hole 440 has a third hole 441 and a fourth hole 442 which communicate with each other, the third hole 441 penetrates the first portion 410 of the protective cover 400, and the fourth hole 442 penetrates the second portion 420 of the protective cover 400. The diameter of the third hole 441 may be greater than the diameter of the fourth hole 442, such that a third step 450 is formed at the connection between the third hole 441 and the fourth hole 442. With the design, the disclosure can use the through hole 440 to accommodate some fasteners and meanwhile can use the third step 450 to implement structural limit. Preferably, the third hole 441 and the fourth hole 442 can be disposed coaxially, which facilitates the formation.

As shown in FIG. 2 and FIG. 3, with the design in which the through hole 440 is disposed on the protective cover 400, and the through hole 440 has the third hole 441 and the fourth hole 442, in an embodiment of the disclosure, the fastener may be a bolt 500, and the bolt 500 may have a nut portion 510 and a threaded rod portion 520. Specifically, the outer diameter of the nut portion 510 may be greater than the outer diameter of the threaded rod portion 520, such that the nut portion 510 can be limited at the third step 450 in the through hole 440, and the threaded rod portion 520 is connected to the beam 300. With the design, in the disclosure, the relative position limit of the bolt 500 in the protective cover 400 is implemented with the design in which the third step 450 is fitted with the nut portion 510. In another embodiment, the fastener may also be a rivet.

In an embodiment of the disclosure, the connection between the protective cover 400 and the positioning hole 110 may be adhesive bonding. In some embodiments, the protective cover 400 and the positioning hole 110 may also adopt other types of connection methods, such as but not limited to welding or interference fit connection, which is not limited to this embodiment.

As shown in FIG. 2 and FIG. 3, in an embodiment of the disclosure, the bolt 500 is illustrated as an example of the fastener. A screw sleeve 310 may be disposed on the beam 300. On this basis, the top portion of the protective cover 400 can abut against the bottom portion of the screw sleeve 310, and the bolt 500 is threadedly connected and fitted with the screw hole of the screw sleeve 310. With the design, the disclosure can use the screw sleeve 310 as a part of the beam 300 to implement the connection with the bolt 500 and allow the top portion of the protective cover 400 to indirectly abut against the beam 300 through the abutting screw sleeve 310.

As shown in FIG. 2, with the design in which the screw sleeve 310 is disposed on the beam 300, in an embodiment of the disclosure, a portion of the screw sleeve 310 may be located inside the beam 300, another portion of the screw sleeve 310 may protrude from the bottom portion of the beam 300 toward the protective cover 400, and the another portion of the screw sleeve 310 abuts against the top portion of the protective cover 400. With the design, the disclosure can utilize a portion of the screw sleeve 310 located inside the beam 300 to strengthen the connection strength between the two and can reduce the occupied space in the height direction.

As shown in FIG. 2 and FIG. 3, with the design in which a portion of the screw sleeve 310 is located inside the beam 300 and another portion of the screw sleeve 310 protrudes toward the protective cover 400, in an embodiment of the disclosure, a sealing member 600 may be disposed between the protective cover 400 and the screw sleeve 310 in a sealing manner, and the sealing member 600 is used to provide a sealing function between the protective cover 400 and the screw sleeve 310. For example, in some embodiments, the sealing member 600 may be a sealing washer, and the sealing washer is sleeved on the bolt 500 and sandwiched between the protective cover 400 and the screw sleeve 310. With the design, the disclosure can further optimize the sealing performance of the battery pack by using the sealing member 600. Optionally, the sealing member 600 may also be a sealant.

As shown in FIG. 2 and FIG. 3, with the design in which a portion of the screw sleeve 310 is located inside the beam 300 and another portion of the screw sleeve 310 protrudes toward the protective cover 400, in an embodiment of the disclosure, the outer diameter of the another portion of the screw sleeve 310 protruding from the beam 300 may be greater than the outer diameters of other portions of the screw sleeve 310. With the design, the disclosure can utilize the larger outer diameter of the screw sleeve 310 for the top portion of the protective cover 400 to abut, thereby further improving the structural stability. Meanwhile, the disclosure can be beneficial to increase the size of the sealing member 600 sandwiched between the screw sleeve 310 and the protective cover 400 and further improve the sealing performance. In addition, the outer diameter of the portion of the screw sleeve 310 protruding out of the beam 300 can be designed to be greater than the width of the inner cavity of the beam 300, that is, the outer diameter of the portion of the screw sleeve 310 is not affected by the width of the inner cavity of the beam 300.

As shown in FIG. 2 and FIG. 3, in an embodiment of the disclosure, the battery pack provided by the disclosure may further include a buffer member 700. Specifically, the buffer member 700 is disposed between the bottom shield plate 100 and the bottom plate 200. With the design, the disclosure can utilize the buffer member 700 to provide a buffer effect between the bottom shield plate 100 and the bottom plate 200 and further improve the stability and reliability of the overall structure of the battery pack.

Meanwhile, it is noted that the battery pack shown in the drawings and described in this specification are but a few examples of the many types of battery packs that can employ the principles of the disclosure. It should be clearly understood that the principles of the disclosure are by no means limited to any detail or any component of the battery pack shown in the drawings or described in this specification.

In summary, the battery pack proposed by the disclosure includes the bottom plate 200, the bottom shield plate 100, and the beam 300. The bottom shield plate 100 is disposed below the beam 300, the bottom plate 200 is disposed between the bottom shield plate 100 and the beam 300, and the positioning hole 110 is disposed on the bottom shield plate 100. The battery pack further includes the protective cover 400. A portion of the protective cover 400 is disposed in the positioning hole 110 and connected to the bottom shield plate 100, the top portion of the protective cover 400 abuts against the beam 300, and the beam 300, the bottom shield plate 100 and the protective cover 400 are connected by a fastener penetrating the protective cover 400. With the design, the disclosure can utilize the design of the abutment between the protective cover 400 and the beam 300, and on the basis of ensuring the reliability of the connection between the bottom shield plate 100 and the beam 300, the disclosure can further optimize the connection effect of the two and improve the strength of the connection between the bottom shield plate 100 and the beam 300.

Other embodiments of the disclosure will be apparent to those skilled in the art from consideration of the specification and practice of the disclosure disclosed herein. The disclosure is intended to cover any variations, uses or adaptations of the disclosure. These variations, uses, or adaptations follow the general principles of the disclosure and include common general knowledge or conventional technical means in the art that are not disclosed in the present disclosure. The specification and embodiments are illustrative, and the real scope and spirit of the present disclosure is defined by the appended claims.

It should be understood that the disclosure is not limited to the precise structures that have been described above and shown in the drawings, and various modifications and variations can be made without departing from the scope thereof. The scope of the disclosure is limited only by the appended claims.

What is claimed is:

1. A battery pack, comprising a bottom plate, a bottom shield plate, and a beam, wherein the bottom shield plate is disposed below the beam, the bottom plate is disposed between the bottom shield plate and the beam, a positioning hole is disposed on the bottom shield plate, the battery pack further comprises a protective cover, a portion of the protective cover is disposed in the positioning hole and connected to the bottom shield plate, a top portion of the protective cover abuts against the beam, and the beam, the bottom shield plate, and the protective cover are connected by a fastener penetrating the protective cover, wherein the bottom shield plate is an extruded profile plate, and a cavity is provided inside the bottom shield plate, wherein the positioning hole penetrates the cavity, and the protective cover blocks the cavity, and wherein the bottom shield plate has an upper wall and a lower wall spaced apart from each other, the upper wall is closer to the bottom plate than the lower wall, the cavity is located between the upper wall and the lower wall, and the positioning hole penetrates through the upper wall and the lower wall.

2. The battery pack according to claim 1, wherein the positioning hole has a first hole and a second hole that communicate with each other, the first hole penetrates through the lower wall, the second hole penetrates through the lower wall, a diameter of the first hole is greater than a diameter of the second hole, such that a lower surface of the upper wall forms a first step on a periphery of the second hole.

3. The battery pack according to claim 2, wherein the protective cover has a first portion and a second portion connected to each other, the second portion is closer to the beam than the first portion, a portion of the first portion is disposed in the first hole, a portion of the second portion is disposed in the second hole, another portion of the second portion protrudes out of the second hole and abuts against the beam, a second step is formed at a connection between the first portion and the second portion, and the second step is limited and fitted with the first step.

4. The battery pack according to claim 3, wherein a through hole is disposed on the protective cover, the through hole penetrates through the protective cover to accommodate the fastener, the through hole has a third hole and a fourth hole that communicate with each other, the third hole penetrates the first portion, the fourth hole penetrates the second portion, and a diameter of the third hole is greater than a diameter of the fourth hole, such that a third step is formed at a connection between the third hole and the fourth hole.

5. The battery pack according to claim 4, wherein the fastener is a bolt, the bolt has a nut portion and a threaded rod portion, an outer diameter of the nut portion is greater than an outer diameter of the threaded rod portion, the nut portion is limited at the third step, and the threaded rod portion is connected to the beam.

6. The battery pack according to claim 1, wherein a connection between the protective cover and the positioning hole comprises adhesive bonding, welding, or interference fit connection.

7. The battery pack according to claim 1, wherein the fastener is a bolt, a screw sleeve is disposed on the beam, the top portion of the protective cover abuts against a bottom portion of the screw sleeve, and the bolt is threadedly connected to a screw hole of the screw sleeve.

8. The battery pack according to claim 7, wherein a portion of the screw sleeve is located inside the beam, and another portion of the screw sleeve protrudes from a bottom portion of the beam toward the protective cover and abuts against the top portion of the protective cover.

9. The battery pack according to claim 8, wherein a sealing member is disposed between the protective cover and the screw sleeve in a sealing manner.

10. The battery pack according to claim 8, wherein an outer diameter of the another portion of the screw sleeve protruding from the beam is greater than outer diameters of other portions of the screw sleeve.

11. The battery pack according to claim 1, further comprising a buffer member disposed between the bottom shield plate and the bottom plate.

* * * * *